US009167209B2

(12) United States Patent
Cook et al.

(10) Patent No.: US 9,167,209 B2
(45) Date of Patent: Oct. 20, 2015

(54) METHOD FOR A TOUCH SCREEN THAT INTERFACES WITH A SET TOP BOX (75) Inventors: Gregory William Cook, Lafayette, IN (US); Charles Bryan Hunt, Westfield, IN (US); Ronald Douglas Johnson, Westfield, IN (US)

(73) Assignee: THOMSON LICENSING, Boulogne-Billancourt (FR)

( * ) Notice: Subject to any disclaimer, the term of this patent is extended or adjusted under 35 U.S.C. 154(b) by 110 days.

(21) Appl. No.: 12/733,707

(22) PCT Filed: Feb. 4, 2008

(86) PCT No.: PCT/US2008/001458
§ 371 (c)(1),
(2), (4) Date: Mar. 16, 2010

(87) PCT Pub. No.: WO2009/038596
PCT Pub. Date: Mar. 26, 2009

(65) Prior Publication Data
US 2010/0238109 A1 Sep. 23, 2010

Related U.S. Application Data (60) Provisional application No. 60/994,186, filed on Sep. 18, 2007.

(51) Int. Cl.
*G09G 5/00* (2006.01)
*G06F 3/041* (2006.01)
(Continued)

(52) U.S. Cl.
CPC .......... *H04N 7/17318* (2013.01); *G06F 3/0346* (2013.01); *G06F 3/03547* (2013.01); *H04N 5/4403* (2013.01); *H04N 5/44543* (2013.01); *H04N 21/4126* (2013.01);
(Continued)

(58) Field of Classification Search
USPC .......................... 348/734; 345/440, 173–178; 178/18.01–20.04
See application file for complete search history.

(56) References Cited

U.S. PATENT DOCUMENTS 4,825,209 A * 4/1989 Sasaki et al. .................. 348/734
5,003,396 A    3/1991 Kang
(Continued)

FOREIGN PATENT DOCUMENTS

EP    1 503 584 A2    2/2005
EP    1 801 690 A1    6/2007
(Continued)

OTHER PUBLICATIONS

Michael Kwan, "The Self-Orienting EV-KD370 Slider Phone From KTF", Mobile Magazine, Jan. 29, 2007, pp. 1-3, via akihabaranews.com.

(Continued)

*Primary Examiner* — Ryan A Lubit
(74) *Attorney, Agent, or Firm* — Vincent E. Duffy; Joel M. Fogelson (57) ABSTRACT A method for control comprises a set top box receiving coordinates from a touch sensing screen. The coordinates are interpreted for controlling the set top box, and in accordance with the interpreted coordinates an action is performed. A further method for control comprises a set top box receiving a signal representative of displacement. A control function is determined from the displacement representative signal and the control function is activated. In accordance with the control function a signal is formed for communication.

28 Claims, 4 Drawing Sheets (51) Int. Cl.
*H04N 5/44* (2011.01)
*H04N 7/173* (2011.01)
*G06F 3/0346* (2013.01)
*G06F 3/0354* (2013.01)
*H04N 5/445* (2011.01)
*H04N 21/41* (2011.01)
*H04N 21/4227* (2011.01)

(52) U.S. Cl.
CPC ..... *H04N 21/4227* (2013.01); *H04N 2005/441* (2013.01); *H04N 2005/443* (2013.01); *H04N 2005/4432* (2013.01)

(56) References Cited

U.S. PATENT DOCUMENTS

| | | | |
|---|---|---|---|
| 5,545,857 A * | 8/1996 | Lee et al. | 345/173 |
| 5,612,719 A | 3/1997 | Beernink et al. | |
| 5,764,179 A * | 6/1998 | Tsurumoto | 345/173 |
| 6,018,336 A | 1/2000 | Akiyama et al. | |
| 6,396,523 B1 | 5/2002 | Segal et al. | |
| 6,496,122 B2 | 12/2002 | Sampsell | |
| 6,765,557 B1 | 7/2004 | Segal et al. | |
| 6,861,946 B2 * | 3/2005 | Verplaetse et al. | 340/407.2 |
| 7,511,632 B2 * | 3/2009 | Nam et al. | 345/158 |
| 2001/0054647 A1 | 12/2001 | Keronen et al. | |
| 2002/0006237 A1 | 1/2002 | Nakamura et al. | |
| 2002/0057399 A1 | 5/2002 | Ishitaka | |
| 2002/0167699 A1 | 11/2002 | Verplaetse et al. | |
| 2003/0023554 A1 | 1/2003 | Yap et al. | |
| 2003/0034957 A1 | 2/2003 | Dubil et al. | |
| 2003/0035075 A1 * | 2/2003 | Butler et al. | 348/734 |
| 2004/0252120 A1 * | 12/2004 | Hunleth et al. | 345/440 |
| 2005/0212760 A1 * | 9/2005 | Marvit et al. | 345/156 |
| 2006/0026521 A1 | 2/2006 | Hotelling et al. | |
| 2006/0026535 A1 | 2/2006 | Hotelling et al. | |
| 2006/0161871 A1 | 7/2006 | Hotelling et al. | |
| 2006/0213267 A1 * | 9/2006 | Tronconi et al. | 73/510 |
| 2008/0088602 A1 * | 4/2008 | Hotelling | 345/173 |
| 2008/0259094 A1 * | 10/2008 | Kim et al. | 345/651 |

FOREIGN PATENT DOCUMENTS

| | | |
|---|---|---|
| JP | 6030485 | 2/1994 |
| JP | 8018813 | 1/1996 |
| JP | 2002502138 | 1/2002 |
| JP | 2003333361 | 11/2003 |
| JP | 2005-522152 | 7/2005 |
| JP | 2006287581 | 10/2006 |
| KR | 2002-0006237 | 1/2002 |
| WO | WO 99/34599 A1 | 7/1999 |
| WO | WO9934599 | 7/1999 |
| WO | WO 03/085965 A1 | 2/2003 |
| WO | WO2007086386 | 8/2007 |

OTHER PUBLICATIONS

"Harmony 1000, User Manual", Logitech, version 1.0, pp. 1-15.
"Harmony 1000 Advanced Universal Remote", Logitech, Copyright 2008, pp. 1-3.
"Royal Philips Electronics RC9800i—The Product", Philips, Copyright 2004, pp. 1-4.
"Philips Multimedia Control Panel RC9800i—Simple, yet revolutionary control", Philips, Nov. 6, 2007, version 4.0, pp. 1-2.
"RC9800i Touch Screen Remote Control User Manual", Royal Philips Electronics, Copyright 2004, pp. 1-62.
Search Report Dated Jun. 12, 2008.

* cited by examiner

Fig. 4  Grid Guide

Fig. 5  Data Structure

METHOD FOR A TOUCH SCREEN THAT INTERFACES WITH A SET TOP BOX

This application claims the benefit, under 35 U.S.C. §119 of U.S. Provisional Patent Application Ser. No. 60/994,186, filed Sep. 18, 2007.

TECHNICAL FIELD

This disclosure relates to the field of remote control of home entertainment equipment, and in particular to a remote controller including motion sensing and or a touch sensing display screen.

BACKGROUND

A typical set top box provides a user interface to allow control of the set top box menu and or an electronic program guide. The menu and electronic program guide are respectively resident, or received, formatted and stored, within in the set top box and can be viewed as on screen displays (OSD) or graphic overlays. Typically the guide or menu features may be activated by physical button pushes or by remote control commands via an exemplary modulated IR link. The guide and menu are intended for user interaction via an on screen display on a TV or video display monitor. Normal display viewing distances dictate that the screen is physically distant from the user and certainly beyond arms reach. A remote audio video display, television, video monitor or viewing tablet may be coupled to view the set top box output signals and clearly substantially the same set top box control as provided to a local viewer must be available to the remote display viewer.

SUMMARY OF THE INVENTION

In an inventive arrangement a touch sensitive viewing device has bidirectional communication with a set top box. The touch sensitive viewing device facilitates sound and image display and provides information to control the set top box and ancillary equipment. In a further inventive arrangement transitory motion and or spatial reorientation of the touch sensitive viewing device can control selections within the set top box and ancillary equipment.

DETAILED DESCRIPTION

Figure 1:
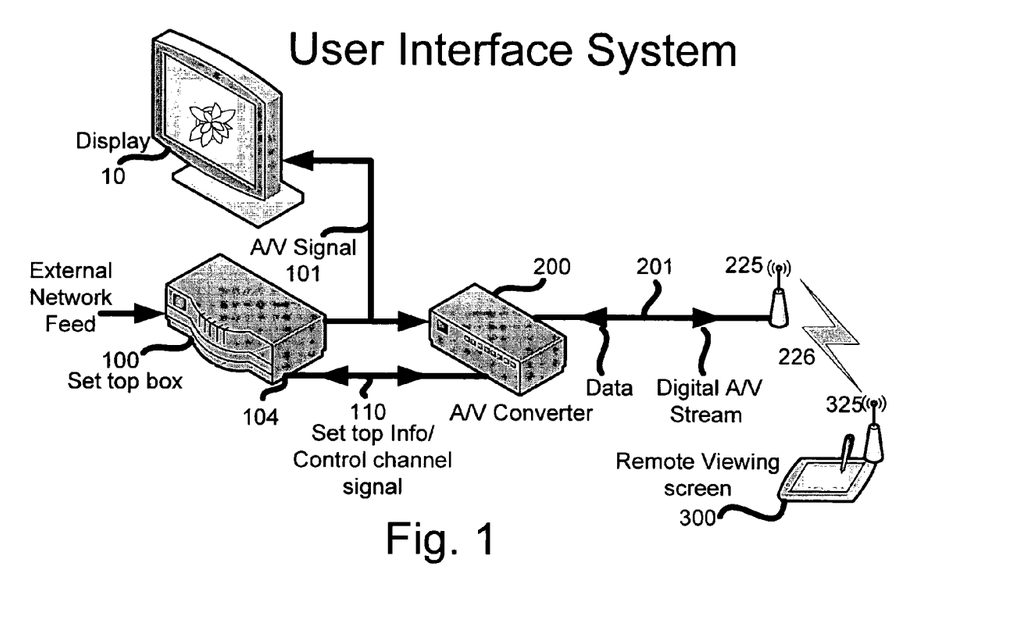
FIG. 1 is a block representation of an inventive arrangement for remote viewing and control.

FIG. 1 shows an inventive arrangement where a set top box is coupled to an audio video (A/V) display device. In addition the set top box user interface also facilitates the use of a remote A/V display, television, video monitor or viewing tablet 300. Clearly the remote viewing device 300 must allow substantially the same control of the set top box as provided to a local viewer. An external network feed is coupled to set top box (STB) 100 for user program selection, resulting in tuning, demodulation, decoding etc. to generate the audio video signals of the desired program. The video part of the audio video signal may have an on screen display (OSD) graphic overlay added or substituted to form an output video signal 101 for coupling to audio video display 10. Video signal 101 may be in the form of an composite analog signal, an analog component signal or as a digital representation of the composite or component video signals. The on screen display (OSD) or graphic overlay can, for example, represent an electronic program guide (EPG) or set top box menu.

Set top box (STB) 100 also has a separate information and control channel connection (104) which couples a bidirectional data bus signal 110 between set top box 100 and audio video (A/V) interface converter 200. Advantageously the output audio video signal, possibly with graphic overlay, which is coupled to display 10 is also coupled to the audio video interface converter 200 which forms a digital A/V stream using for example, a compression algorithm such as MPEG 4. This compressed digital A/V stream is processed or modulated for transmission by antenna 225 to a remote viewing device 300 using an exemplary Wi-Fi or digital wireless link 226 operating in accordance with an exemplary standard such as IEEE 802.11. An antenna 325 at or within viewing device 300 receives the digital A/V stream 226 and forms therefrom an image with sound, substantially as provided to display 10.

However, as discussed previously, the program guide and set top box menu information are resident and or generated within the set top box and may be activated by physical button pushes or remote control commands. The guide and the menu, are intended for user interaction via an OSD or graphical image on a video display. Furthermore, optimal viewing conditions suggest a certain minimum viewing distance which places the screen of display 10 distant from the user and certainly beyond his reach. Thus, the user set top box interaction is usually performed remotely from the display screen which tends to preclude the concept of screen touch control of the STB user interface, not to mention the undesirability of finger-prints on the screen.

Figure 2:
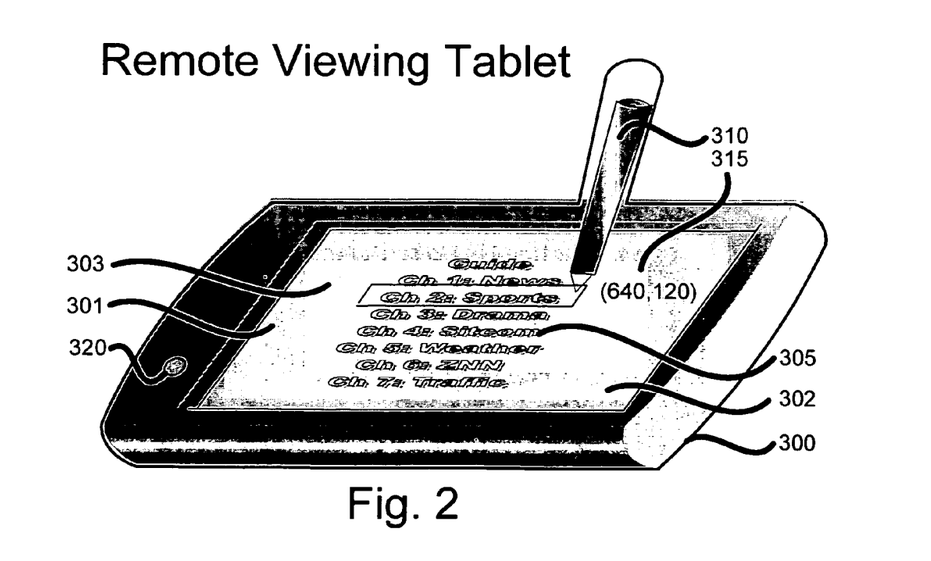
FIG. 2 depicts an exemplary inventive viewing tablet for use in the arrangement of FIG. 1.

FIG. 2 shows a remote viewing device 300 which facilitates the reception of the digital A/V stream comprising content which can be identical to that coupled to display 10 or which may advantageously be user selected to be different from the content coupled to display 10. Viewing device 300 employs an image display 301 which is overlaid by a touch sensitive interface 302 to provide the user the ability to select a portion of a screen image by touch. However as discussed, a standard set top box user interface is not capable of touch screen control.

Figure 6A:
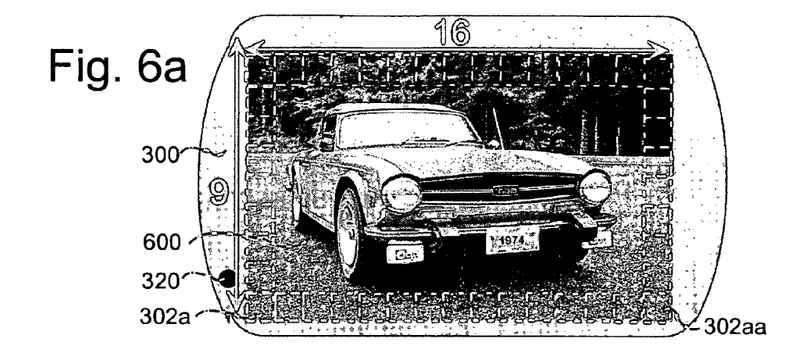
FIGS. 6a, 6b, 6c, 6d depict the viewing tablet of FIG. 2 when subject to twisting, tilting and rotation.

A user viewing display screen 301 may select, by means of a finger or exemplary stylus 310, a particular screen portion, for example a section of an OSD 305 forming part of image 303. As is known, the touch sensitive interface of viewing tablet 300 includes circuitry which generates coordinates 315 that locate the screen touch within the touch sensitive area 302. These touch coordinates 315 are transmitted from viewing tablet 300 via antenna 325 to STB 110 socket 104, via interface converter 200. A bidirectional path 201, 226 provides A/V content 101 for viewing as image 303 on screen 301, and also provides a reverse channel to couple the touch coordinates or control instructions to STB100. The touch coordinate or coordinates are input to STB 100 for processing and mapping to the current screen display, typically the OSD or guide grid. Image mapping for viewing tablet 300 may be performed based on certain parameters such as the aspect ratio of tablet 300 and possibly the aspect ratio of the source image, for example to view wide screen movies. Tablet 300 of FIG. 6a may have a screen ratio of width to height the same as or similar to those associated with current TV standard, i.e. 16:9. In FIG. 6a the display tablet 300 is depicted with an exemplary ratio of 16:9, however, the user may choose to physically orient the display differently by rotating through approximately 90 degrees which results in a ratio of 9:16 as shown in FIGS. 6c, and 6d. Furthermore display tablet 300 may be of a physical size that may be rotated, twisted, turned or tilted. Thus to accommodate a rotated display and to avoid geometric distortion of the displayed image various choices are possible for source image mapping on display 300. However, such source image mapping must be performed without disturbance to signal 101 feeding display 10. Control and implementation of such image mapping will be described later.

The remote viewing space 301 of display tablet 300 is mapped to the STB user interface space in order that touch coordinates from the remote viewing device are interpreted to initiate the user desired set top box command. The interpreted command may result for example, in a change to the OSD information or change in program selection, and this result is then communicated to both display 10 and remote display 300. Furthermore, manipulation and orientation of display tablet 300 also forms not only an essential part of the mapping to the STB user interface space but in addition may provide control capabilities. As mentioned previously, twisting or rotating tablet 300 through approximately 90 degrees must be accommodated, not only in terms of the image but also to maintain user operability by altering the functional mapping of specific touch screen areas. For example, a user function associated with sense area 302a of FIG. 6a must be mapped to sense area 302aa when display 300 is rotated clockwise by approximately 90 degrees.

Figure 6B:
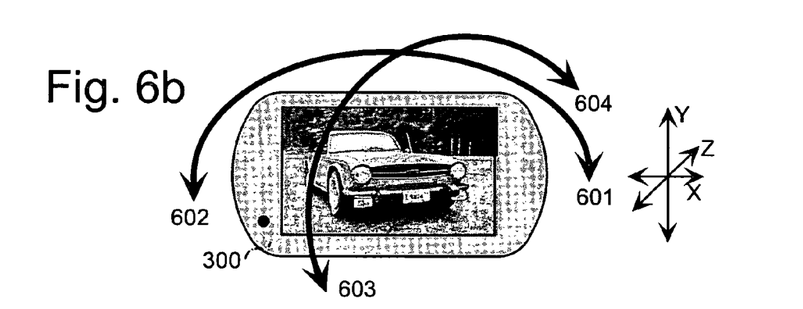
Figures 6C, 6D:
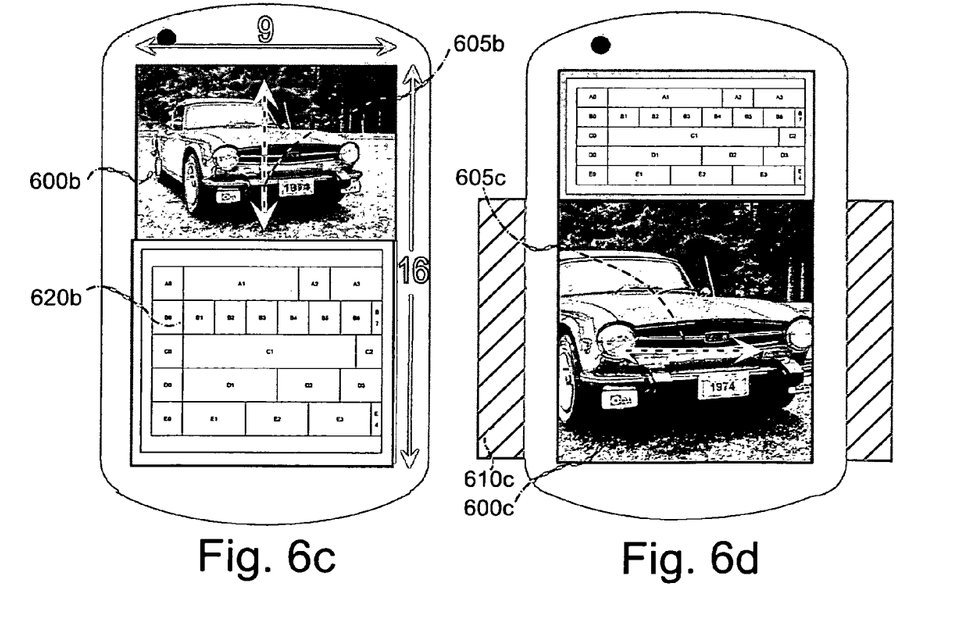

Display tablet 300 advantageously includes a device for detecting the orientation and or movement of the tablet as depicted in FIG. 6b. For example, by detecting orientation it can be determined which display edge, long or short is approximately pointing down, and such information can be provided by devices such as, tilt sensors, inclinometers, accelerometer, gyroscopes and the like. Information relating to the positioning, or change in orientation of the display tablet is communicated to interface converter 200 and set top box 100 to be used in mapping or interpreting user motion and or touch commands. Detection of display orientation may be used advantageously to provide functional control of, for example, remote display image selection as shown in FIGS. 6c and 6c, channel change, audio volume up down or mute, etc. The sensing of display motion provides an alternative user control mechanism, which in addition can reduce or eliminate a number of screen touches and associated control mapping.

FIG. 2 shows viewing device or tablet 300 with display 301 and touch screen 302 which is used to update the user interface in the set top box. The touch screen 302 may be activated by button or rocker switch 320 or by touching a specific screen location, such as a particular screen corner 302a of FIG. 6a. Switch 320 may allow a double push, to and fro rock or sustained activation to select between desired STB control features. The use of specific screen locations can be employed to select which SIB features the user wishes to control, for example STB menu or program guide. Furthermore, a double screen touch or sustained touch may provide a dual control function. For example, with a double touch arrangement the initial screen touch determines the on screen image (OSD) part or portion to be controlled by the remote viewer. The second touch may for example be required to occur within a specific, relatively short time window in order to be recognized as a double touch command and as such this second touch may represent an enter, activate or go command. Similarly, a sustained touch arrangement may for example, determine the on screen image (OSD) part or portion to be controlled and following an extended, but relatively short touch time, may represent an enter, activate or go command. In addition to double touch or sustained touch user control, screen 302 may advantageously provide the ability to scroll to the left or right or up or down simply by dragging a finger or stylus over a plurality of screen sensing areas or cells in a given interval. For example, a short drag over a limited number of cells may cause a minor change in on screen image position where dragging over a greater number of cells in a similar time interval may cause the on screen image to change pages, i.e. scroll to a future event in the program guide.

As mentioned previously, display tablet 300 may include an accelerometer such as typel LIS302DL manufactured by ST Microelectronics, or similar device for detecting motion and orientation of the tablet. Tablet orientation or motion information is supplied to interface 200 and set top box 100 to advantageously provide control commands, and for certain tablet orientations to remap only video signal 101 for display on the rotated display tablet 300. In addition the touch coordinates may be remapped in accordance with the display orientation and chosen display layout. Tablet 300 orientation with consequential image size and layout changes must be implemented independently from the video representative signal 101 supplied to display 10. To facilitate the image size and layout changes resulting from reorienting tablet 300 audio video interface converter 200 includes a digital image processing arrangement which includes image processing control, image scaling, and memory. In addition interface converter 200 may receive from set top box 100 data representing the electronic program guide and the set top box menu. These data may be provided separately from and not combined with video representative signal 101. In this way interface converter 200 can format an image signal specifically for display by tablet 300 without effecting the image on display 10.

Figure 3A:
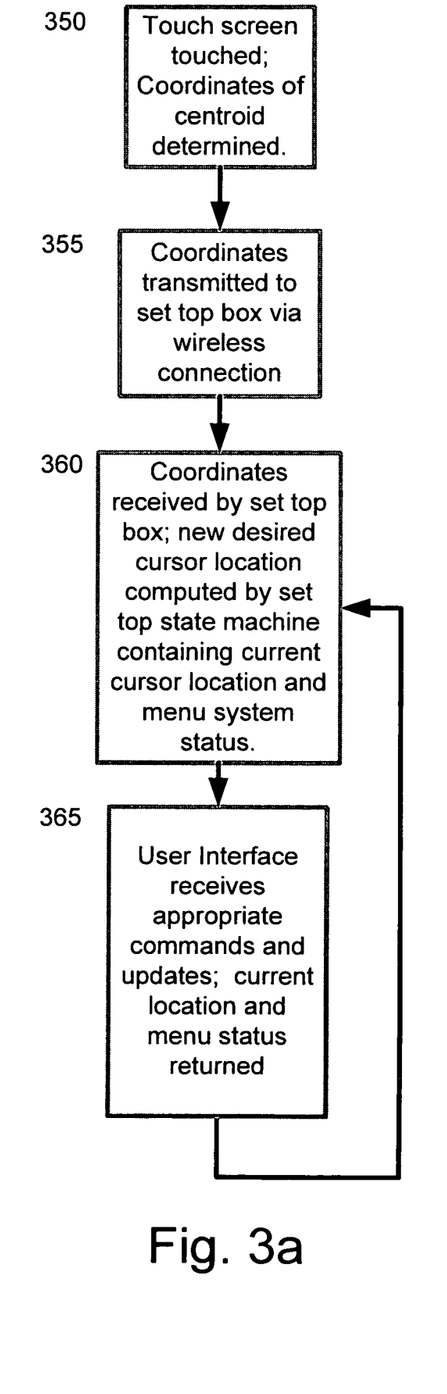
FIGS. 3a and 3b are exemplary sequences used in the arrangements of FIGS. 1 and 2.

FIG. 3a shows an exemplary sequence of touch screen control operations 350-365 occurring between remote viewer 300 and set top box 100 and applies to the case where the program guide is generated entirely within the set top box and is to be viewed with the remote viewing device. In block 350 the touch screen senses that a touch has occurred. The coordinates 315 of the screen touch are determined, modulated and transmitted by exemplary digital wireless link 226 to converter 200 for demodulation and coupling as signal 110 to set top box 100. The coordinates are received in the set top box where a state machine containing the local state of the menu system and the current location computes the desired location and the appropriate commands to reach that position. In addition, the state machine may also determine that a particular action, for example a change of channels, may be required. This may be communicated as described previously by a second touch or double tap on the screen with similar coordinates to indicate, in addition to possible cursor movement, a particular action is requested. The user interface then receives the appropriate commands and if necessary sends a new cursor location and menu status to the set top box state machine.

Figure 3B:
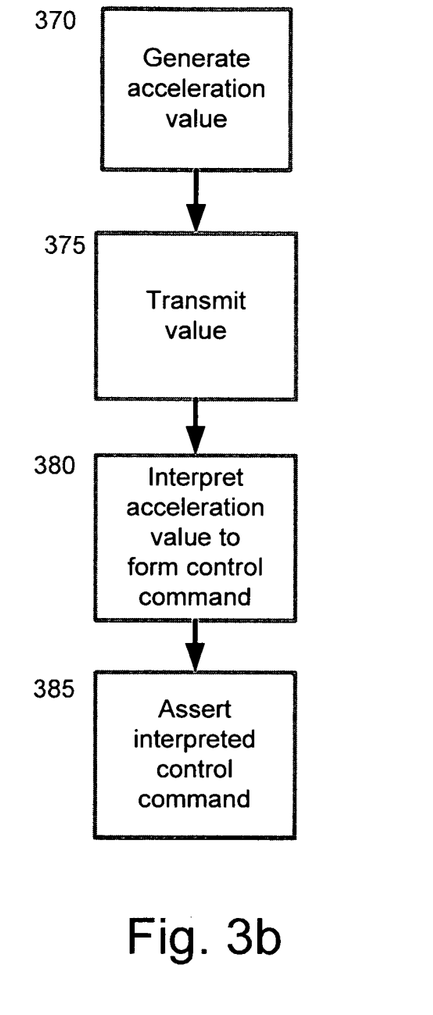

FIG. 3b shows an exemplary sequence relating to movement of viewing tablet 300 as has been described and illustrated in FIG. 6b. An accelerometer device or the like within viewing tablet 300 generates values in three planes X, Y, Z which resolve the motion depicted by arrows 601, 602 and 603, 604. Block 370 of FIG. 3b represents the generation of acceleration values in response to a user movement of the display tablet. Clearly such movement is likely to be substantially radial however the movement may be resolved as Cartesian values X, Y, Z sensed by the accelerometer. The acceleration values resulting from rotating, twisting or tilting the display are transmitted to interface 200 at bock 375. At block 380 the accelerometer values are interpreted, for example by use of a lookup table, as being representative of certain control functions. Interpretation may be performed at either interface 200, set top box 100 or at both locations. However, certain acceleration values, for example representative of display rotation, rather than transitory to and fro twists or tilts, are utilized within interface 200 to reformat images for display and if necessary to reorder the touch sensing layout. Accelerometer values which are analogs of to and fro twists or tilts, may interpreted to be representative of, for example, control functions such as channel up, channel down, volume up or down or mute. At block 380 the interpreted control functions are asserted. Advantageously such transitory to and fro motion of the viewing tablet can provide user control without touch screen contact.

Figure 4:
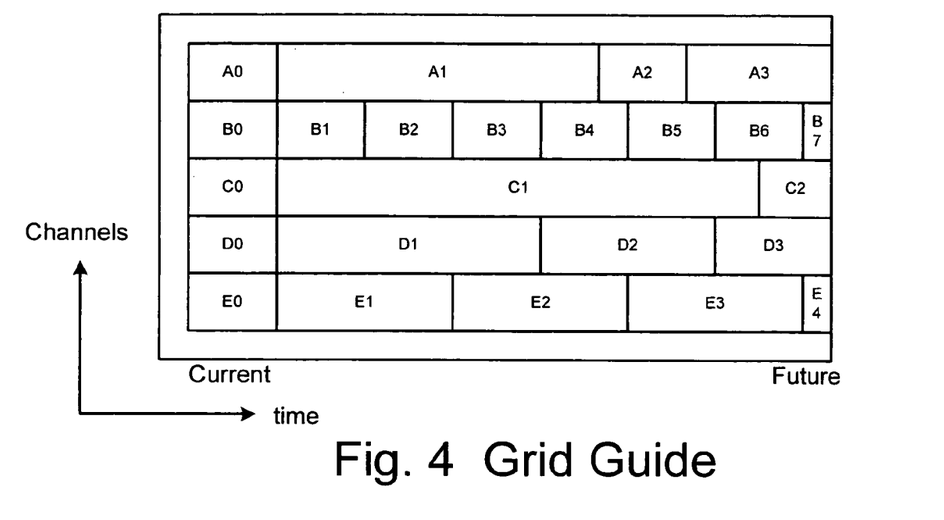
FIG. 4 shows a typical electronic program guide arranged as a grid display.
Figure 5:
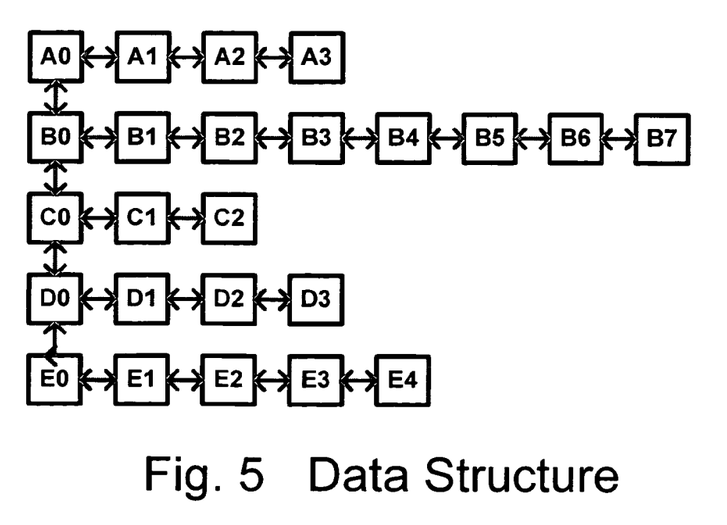
FIG. 5 is a data structure representative of the electronic program guide of FIG. 4.

The operational sequence depicted in FIG. 3a can be implemented by the following exemplary arrangement. Screen 301 of FIG. 2 is divided into rectangular regions which are mapped into a canonical version of the guide (EPG) as shown in FIG. 4. In this case, each of the regions represents a section of a grid guide which describes programming content. Sections A0 to E0 of FIG. 4 represent home areas (channels) and column zero (0) describes programming that is currently occurring, however, this graphical arrangement represents one of many possible display arrangements. Each rectangle of FIG. 4 can be uniquely identified, e.g., with an upper left corner address, height and width. In one exemplary implementation the on-screen guide data is stored as a linked list as shown in FIG. 5, where each channel (A0-E0) may display a number of programs (i.e. B0 shows 1-8) with selection by lateral navigation. However, to access other channels it is necessary to navigate up and down the list. In a conventional implementation of the grid guide, up and down arrows are used to select a program. However, inevitably program junctions do not align, i.e. their respective beginning and end times are different between each channel, hence it is possible that multiple and non-required program selections could fulfill an up/down movement command. For example, when moving up from C1 to the B row, it is unclear which of the 6 programs, B1 through B6 should be selected. This ambiguity is remedied by the user choosing a specific program then selecting a cursor move to the right or left as appropriate. However, with remote touch screen operation this option may not be available. Assume a data structure as shown in FIG. 5, then determination of the correct sequence of commands for the user interface is straightforward. For example, in FIG. 5 assume the current cursor location is A2. Within each program area (data structure) are the unique identifiers of the location, e.g. the upper left corner and the height and width. A first interpretive method may be performed as follows. The y or vertical coordinate of the touch is received by STB 100 from remote display tablet 300, and then by sequencing through A0 through E0 via the linked list and the coordinates contained therein it is determined which row was selected. Within that row, the x or horizontal touch coordinate would be used to determine which program area was selected by incrementing through the linked list in the horizontal direction. Using the information contained in the linked list, a sequence of direction commands, if required, could be sent to the User Interface to implement the command. For this example, if the program E2 were touched, then four down commands could be used to get from A2 to the E row, but it is unclear whether E2 or E3 should be selected. This ambiguity of the first interpretive operation is obviated by the following commands as determined from the linked list in FIG. 5. Commands Left, Left, locate column 0, commands Down, Down, Down, Down select the desired program E0 and Right, Right select the required time period, or program E2. In this way the correct area of the screen is selected with no chance of ambiguity, and without changing the STB user interface paradigm for non-touch screen applications.

It is important to note that the linked list data structure depicted in FIG. 5 must be updated after each operation, since the screen itself can change in response to a command. For example, selection of any of the boxes on the right hand side of the FIG. 4 guide would cause the display to page right to reveal future programs, and consequently require the data structure to be changed.

The exemplary sequence of coordinate mapping described with respect to FIG. 5 may result in a command sequences which are similar to those commands emanating from a conventional IR remote control and as such are readily interpretable by the set top box control logic.

FIG. 6a shows an image 600 on display tablet 300 with an orientation which produces an aspect ratio of, for example, 16:9. Image 600 is shown, for ease of illustration, with only a peripheral array of broken line rectangles, for example 302a and 302aa. These broken line rectangles are representative of individual sensing areas forming touch sensor 302 and these sensing areas may substantially cover display 301. As mentioned previously, by sensing motion of display 300 it is possible to cause or generate control commands without any requirement for a screen touch. Furthermore, certain control functions can be generated by a momentarily to and fro inclination of the display to left or right or forward and back to reduce or obviate the need for screen touches.

FIG. 6b shows possible user movements or displacements of display tablet 300. Displacement of tablet 300 may be resolved by a device such as an accelerometer which resolves motion in three planes X, Y, Z as depicted. Twisting the tablet in the plane of the display is depicted by arrows 601, 602 is resolved by accelerometer values occurring in at least the X and Y sensing planes. Back and forward motion, depicted by arrows 603, 604 is represented by accelerometer values generated in the Z plane or axis.

Arrow 601 shows a possible clockwise directional rotation in the plane of the display. Clearly rotation is also possible in a counter clockwise direction and, in addition, such clockwise and or counter clockwise rotation may be recognized and used to provide differing control commands for selection different functions in the set top box and or interface 200.

However, such spatial reorientation may also be combined with a screen touch at a particular location, for example sensing area 302a, to minimize the number of touches required for a specific control function. For example, a user may grip the display in the left hand with a thumb covering sensing area 302a. Upon rotating display 300 clockwise, information from both the tilt sensor and the touch coordinates are sent to interface 200 and set top box 100. Interface 200 may currently be processing image 600 from the set top box and in addition acquires data representative of the electronic program guide (EPG). Image 600 and the EPG data are scaled and combined to form an exemplary 9:16 image formatted as a picture out of picture by scalier circuitry resident within interface 200. In this way the remote viewer with display 300 may observe a second or alternative image source without interrupting signal 101 coupled to display 10. However, if a selection is made within the exemplary program guide 620b then signal 101 coupled to display 10 will change accordingly.

In FIG. 6c display tablet 300 is reoriented by 90 degrees yielding an exemplary 9:16 ratio display. FIG. 6c shows two exemplary images, 600b, 620b having different sizes and arranged with a picture out of picture format. Source image 600 is scaled or minified to form image 600b which fits within the display width whilst maintaining the geometry of image 600. The consequence of image 600 minification is that the display screen may have an area or areas that may be utilized to display other mages such as the program guide 620b, set top box menu, personal pictures or wall paper.

FIG. 6d shows a further image mapping selection where the height of the image 600 is maintained as in the 16:9 tablet orientation of FIG. 6a but image 600 is cropped horizontally producing an incomplete picture 600d. This image selection may in addition allow horizontal image panning, represented by arrow 605c to reveal the missing or cropped picture content 610c. Image panning may be performed by directional finger motion or by transitory display tilting. FIGS. 6c and 6d may, for example, be facilitated by the direction of rotation of display 300. For example if the display 300 of FIG. 6a is rotated clockwise then the FIG. 6c format may result whereas a counter clockwise motion may result the format of FIG. 6d. Thus by rotating the display the viewer may rapidly review a second or supplementary image without any button or touch screen contact and without disturbing the image provided to display 10.

It will be appreciated that the touch and motion interface of viewing tablet 300 can offer the remote viewer control capabilities which are different from, or absent in the user interface repertoire of a standard set top box. Furthermore these advantageous control capabilities can be translated to utilize appropriate standard set top box commands by software resident within viewing tablet 300 or by supplemental interpretive algorithms added to a standard set top box. These various advantageous arrangements allow the set top box user interface to remain visually and operationally substantially similar regardless of how the set top box guide or menu is controlled i.e. by push buttons switches, remote control commands, touch or motion commands.

What is claimed is:

1. A method for controlling a set top box, said method comprising:
   receiving, via said set top box, coordinates from a remotely located touch sensing screen;
   interpreting, via said set top box, said coordinates for controlling said set top box;
   performing, via said set top box, a first action in accordance with said interpreted coordinates;
   receiving, via said set top box, signals in response to movements of said touch sensing screen, each said movement having an associated acceleration value;
   interpreting, via said set top box, first acceleration values as being associated with display functions;
   interpreting, via said set top box, second acceleration values different from said first acceleration values as being associated with non-display functions;
   selectively enabling, via said set top box, one of said display functions or one of said non-display functions based on a received acceleration value; and wherein:
   said display functions include said touch sensing screen displaying a video portion without an electronic program guide while said touch sensing screen is positioned in a first orientation;
   a first movement of said touch sensing screen in a first direction from said first orientation causes said touch sensing screen to display said electronic program guide along with said video portion in a first display configuration in which said electronic program guide and said video portion exhibit a first size ratio relative to one another;
   a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and
   said electronic program guide includes a plurality of user selectable regions for enabling program selection for display in said video portion where sizes of said user selectable regions are different in said first and second display configurations.

2. The method of claim 1, wherein said step of performing said first action includes communicating a result of said first action from said set top box to said touch sensing screen.

3. The method of claim 1, wherein:
   said display functions include a display rotation function for said touch sensing screen; and
   said non-display functions include at least one of a volume change function and an activation of an audio mute function.

4. The method of claim 3, wherein:
   a rotation of said touch sensing screen causes one of said display functions to be performed; and
   at least one of a twisting and a tilting of said touch sensing screen causes one of said non-display function to be performed.

5. A control method for a set top box, said method comprising:
   acquiring, via said set top box, coordinates from a remotely located touch sensing screen;
   interpreting, via said set top box, said coordinates for controlling said set top box;
   forming, via said set top box, a cursor position in accordance with said interpreted coordinates;
   activating, via said set top box, a first function in accordance with said cursor;
   communicating, via said set top box, said activated first function to said touch sensing screen;
   receiving, via said set top box, signals in response to movements of said touch sensing screen, each said movement having an associated acceleration value;
   interpreting, via said set top box, first acceleration values as being associated with display functions;
   interpreting, via said set top box, second acceleration values different from said first acceleration values as being associated with non-display functions;
   selectively enabling, via said set top box, one of said display functions or one of said non-display functions based on a received acceleration value; and wherein:
   said display functions include said touch sensing screen displaying a video portion without an electronic program guide while said touch sensing screen is positioned in a first orientation;
   a first movement of said touch sensing screen in a first direction from said first orientation causes said touch sensing screen to display said electronic program guide along with said video portion in a first display configuration in which said electronic program guide and said video portion exhibit a first size ratio relative to one another;

a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and said electronic program guide includes a plurality of user selectable regions for enabling program selection for display in said video portion where sizes of said user selectable regions are different in said first and second display configurations.

6. The method of claim 5, wherein said forming step additionally comprises selecting said cursor position in accordance with said coordinates occupying a predetermined range of coordinate values.

7. The method of claim 5, wherein said forming step additionally comprises selecting a function in accordance with said cursor position.

8. The method of claim 5, wherein:
said display functions include a display rotation function for said touch sensing screen; and
said non-display functions include at least one of a volume change function and an activation of an audio mute function.

9. The method of claim 8, wherein:
a rotation of said touch sensing screen causes one of said display functions to be performed; and
at least one of a twisting and a tilting of said touch sensing screen causes one of said non-display functions to be performed.

10. A device, comprising:
an input for receiving signals in response to movements of a touch sensing screen associated with said device, each said movement having an associated acceleration value; and
a processor for interpreting first acceleration values as being associated with display functions and interpreting second acceleration values different from said first acceleration values as being associated with non-display functions, wherein one of said display functions or one of said non-display functions is performed based on a received acceleration value; and wherein:
said display functions include said touch sensing screen displaying a video portion without an electronic program guide while said touch sensing screen is positioned in a first orientation;
a first movement of said touch sensing screen in a first direction from said first orientation causes said touch sensing screen to display said electronic program guide along with said video portion in a first display configuration in which said electronic program guide and said video portion exhibit a first size ratio relative to one another;
a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and said electronic program guide includes a plurality of user selectable regions for enabling program selection for display in said video portion where sizes of said user selectable regions are different in said first and second display configurations.

11. The device of claim 10, wherein said interpreting comprises using a lookup table to identify control commands in accordance with said received signals.

12. The device of claim 10, wherein said interpreting additionally comprises:
identifying in accordance with said received signals, first and second directional displacements of said touch sensing screen; and
activating first and second control functions in accordance with said identified first and second directional displacements, respectively.

13. The device of claim 10, wherein:
said display functions include a display rotation function for said touch sensing screen; and
said non-display functions include at least one of a volume change function and an activation of an audio mute function.

14. The device of claim 13, wherein:
a rotation of said touch sensing screen causes one of said display functions to be performed; and
at least one of a twisting and a tilting of said touch sensing screen causes one of said non-display functions to be performed.

15. A device, comprising:
a processor configured to:
receive coordinates from a remotely located touch sensing screen;
interpret said coordinates for controlling a set top box;
perform a first action in accordance with said interpreted coordinates;
receiving signals in response to movements of said touch sensing screen, each said movement having an associated acceleration value;
interpret first acceleration values as being associated with display functions;
interpret second acceleration values different from said first acceleration values as being associated with non-display functions;
selectively enable of said display functions or one of said non-display functions based on a received acceleration value; and wherein:
said display functions include said touch sensing screen displaying a video portion without an electronic program guide while said touch sensing screen is positioned in a first orientation;
a first movement of said touch sensing screen in a first direction from said first orientation causes said touch sensing screen to display said electronic program guide along with said video portion in a first display configuration in which said electronic program guide and said video portion exhibit a first size ratio relative to one another;
a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and said electronic program guide includes a plurality of user selectable regions for enabling program selection for display in said video portion where sizes of said user selectable regions are different in said first and second display configurations.

16. The device of claim 15, wherein said first action operation includes communicating a result of said first action from said set top box to said touch sensing screen.

17. The device of claim 15, wherein:
said display functions include a display rotation function for said touch sensing screen; and
said non-display functions include at least one of a volume change function and an activation of an audio mute function.

18. The apparatus of claim 17, wherein:
a rotation of said touch sensing screen causes one of said display functions to be performed; and
at least one of a twisting and a tilting of said touch sensing screen causes one of said non-display functions to be performed.

19. A device, comprising:
a processor configured to:
acquire coordinates from a remotely located touch sensing screen;
interpret said coordinates for controlling said set top box;
form a cursor position in accordance with said interpreted coordinates;
activate a first function in accordance with said cursor;
communicate said activated first function to said touch sensing screen;
receive signals in response to movements of said touch sensing screen, each said movement having an associated acceleration value;
interpret first acceleration values as being associated with display functions;
interpret second acceleration values different from said first acceleration values as being associated with non-display functions;
selectively enable one of said display functions or one of said non-display functions based on a received acceleration value; and wherein:
said display functions include said touch sensing screen displaying a video portion without an electronic program guide while said touch sensing screen is positioned in a first orientation;
a first movement of said touch sensing screen in a first direction from said first orientation causes said touch sensing screen to display said electronic program guide along with said video portion in a first display configuration in which said electronic program guide and said video portion exhibit a first size ratio relative to one another;
a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and
said electronic program guide includes a plurality of user selectable regions for enabling program selection for display in said video portion where sizes of said user selectable regions are different in said first and second display configurations.

20. The device of claim 19, wherein said forming operation additionally comprises selecting said cursor position in accordance with said coordinates occupying a predetermined range of coordinate values.

21. The device of claim 19, wherein said forming operation additionally comprises selecting a function in accordance with said cursor position.

22. The apparatus of claim 21, wherein:
said display operations include a display rotation function for said touch sensing screen; and
said non-display operations include at least one of a volume change function and an activation of an audio mute function.

23. The apparatus of claim 22, wherein:
a rotation of said touch sensing screen causes one of said display functions to be performed; and
at least one of a twisting and a tilting of said touch sensing screen causes one of said non-display functions to be performed.

24. A method, comprising:
receiving signals in response to movements of a touch sensing screen associated with a device, each said movement having an associated acceleration value; and
interpreting first acceleration values as being associated with display functions and interpreting second acceleration values different from said first acceleration values as being associated with non-display functions, wherein one of said display functions or one of said non-display functions is performed based on a received acceleration value; and wherein:
said display functions include said touch sensing screen displaying a video portion without an electronic program guide while said touch sensing screen is positioned in a first orientation;
a first movement of said touch sensing screen in a first direction from said first orientation causes said touch sensing screen to display said electronic program guide along with said video portion in a first display configuration in which said electronic program guide and said video portion exhibit a first size ratio relative to one another;
a second movement of said touch sensing screen from said first orientation and in a second direction different from said first direction causes said touch sensing screen to display said electronic program guide along with said video portion in a second display configuration in which said electronic program guide and said video portion exhibit a second size ratio relative to one another, said second size ratio being different from said first size ratio; and
said electronic program guide includes a plurality of user selectable regions for enabling program selection for display in said video portion where sizes of said user selectable regions are different in said first and second display configurations.

25. The method of claim 24, wherein said interpreting operation comprises using a lookup table to identify control commands in accordance with said received signals.

26. The method of claim 24, wherein said interpreting step additionally comprises:
identifying in accordance with said received signals, first and second directional displacements, of said touch sensing screen; and activating first and second control functions in accordance with said identified first and second directional displacements, respectively.

27. The method of claim 24, wherein:

said display functions include a display rotation function for said touch sensing screen; and said non-display functions include at least one of a volume change function and an activation of an audio mute function.

28. The method of claim 27, wherein:

a rotation of said touch sensing screen causes one of said display functions to be performed; and at least one of a twisting and a tilting of said touch sensing screen causes one of said non-display functions to be performed.

* * * * *